United States Patent Office 3,322,774
Patented May 30, 1967

3,322,774
1-(4-PIPERIDYL)-HYDRAZINE DERIVATIVES
Ernst Jucker, Ettingen, Adolf J. Lindenmann, Basel, and John Gmünder, Muttenz, Switzerland, assignors to Sandoz Ltd. (also known as Sandoz A.G.), Basel, Switzerland
No Drawing. Filed Jan. 6, 1964, Ser. No. 336,024
Claims priority, application Switzerland, Jan. 11, 1963, 359/63
11 Claims. (Cl. 260—293)

The present invention relates to new heterocyclic compounds and to a novel process for the production of hydrazines from hydrazones.

The present invention provides hydrazine derivatives of Formula I,

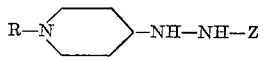

I in which R signifies a lower alkyl, aralkyl or lower dialkylamino radical, and Z signifies a hydrozen atom, an acyl radical or the radical

and their acid addition salts with organic and inorganic acids. The term "lower" indicates alkyl radicals with 1–4 carbon atoms and dialkylamino radicals with 1–4 carbon atoms in each of the alkyl portions.

For practical purposes only two processes have hitherto been used for the conversion of hydrazones and azines into the corresponding hydrazine derivatives, i.e. reduction (i) with catalytically activated hydrogen and (ii) with lithium aluminium hydride. Catalytical hydrogenation cannot be used when the hydrazine radical of these compounds is not stabilized with a carbonyl radical because, simultaneously with the reduction, the hydrazine group is partially split. Even when the hydrazine group is stabilized with an acyl or carboxyl substituent but contains somewhere else in the molecule an aralkylamino or a further hydrazine group, reduction with catalytically activated hydrogen is successful, since, simultaneously, the aralkyl radical becomes split off or the further hydrazine group becomes partially split. The reduction with lithium aluminium hydride cannot be used for hydrazones or azines containing an acyl, carboxyl or nitrile radical, since reduction of these radicals takes place at the same time as that of the hydrazone or azine.

It has recently been proposed to use sodium borohydride for the reduction of hydrazones of the formulae

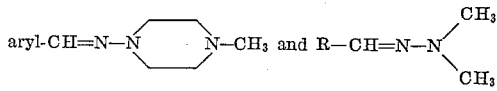

The use of this reagent, however, is limited to hydrazones in which neither of the two nitrogen atoms has a hydrogen atom directly attached. Furthermore, it is notorious that hydrazones and semicarbazones are not readily reduced by complex borohydrides; this is especially true for steroids.

No process has hitherto been known by which hydrabones having a hydrogen atom directly attached to the nitrogen atom, i.e. compounds of the following formula

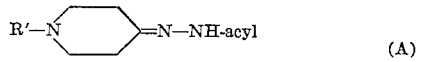

(A)

in which R′ signifies an aralkyl or a lower dialkylamino radical, can be converted to the corresponding hydrazines. Therefore, such hydrazines have hitherto been unknown.

It has now surprisingly been found that the hydrazones of Formula A can be reduced to the corresponding hydrazines by treating them with sodium borohydride in a polar solvent, and that this treatment avoids or minimises undesired secondary reaction. This is an unexpected discovery since recent work on hydrazones of structure R—CH=N—NH$_2$ and R—CH=N—NH—R′ has tended to confirm the view that they are inert towards sodium borohydride. This reaction with sodium borohydride in a polar solvent is, however, not limited to Compounds A, but may be applied to all hydrazones of Formula II

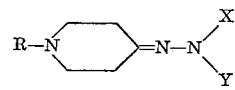

II in which R has the above significance, X signifies a hydrogen atom, and Y signifies an acyl radical or the radical

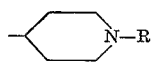

or X and Y together signify the radical

The present invention therefore provides a process for the production of hydrazine derivatives of Formula I

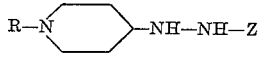

wherein R represents a lower alkyl, aralkyl or lower dialkylamino radical and Z represents a hydrogen atom, an acyl or

radical, and their salts with inorganic and organic acids, characterized in that a compound of Formula II,

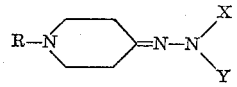

II wherein R has the above significance, X represents a hydrogen atom and Y represents an acyl or

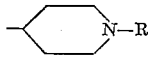

radical or X and Y together represent the radical

is reacted with sodium borohydride in the medium of a polar solvent, any undesired acyl radical present in the resulting reduction product is split off and reaction with an inorganic or organic acid is effected when an acid addition salt is required.

Any acyl radical which may be present in the resulting hydrazines may, if desired, be split off, e.g. by heating with an aqueous mineral acid, and the end product may, if required, be converted into the corresponding salt by treating with an inorganic or organic acid.

Attempts to produce compounds I by known processes bring about undesired side reactions, especially partially splitting of the hydrazine group, splitting off the aralkyl radical or reduction of the acyl radical. It would thus be necessary to effect a difficult separation process to obtain compounds I and a much lower yield would be obtained. In the process of the invention, however, a novel selective method for the reduction of the >C=N—NH— group is used, whereby the above mentioned hydrazine derivatives may be obtained by a one step reaction and in a good yield, secondary reactions being avoided or minimised.

One method of effecting the process of the invention is as follows: Reduction is effected with sodium borohydride, preferably used in excess, in solution in a polar solvent, e.g. water, a mixture of water and methanol, or other aqueous alcoholic solutions. The reaction temperature is maintained between 0° and 50°, the reaction period is a few hours to several days. Reduction is advantageously effected with exclusion of oxygen. After completion of the reaction, excess sodium borohydride is decomposed by the addition of methanol and heating the reaction mixture for a short time, and the resulting hydrazine is extracted with a suitable solvent, e.g. methylene chloride, chloroform, carbon tetrachloride, ether, tetrahydrofuran and benzene. The hydrazine derivative may be distilled in a high vacuum for further purification.

Some of the hydrazones of Formula II are new.

Compounds of Formula II, in which R signifies a dialkylamino radical, X signifies a hydrogen atom and Y signifies an acyl radical, may be produced, for example, by condensation of 1-dimethylaminopiperidone-(4) with a monoacyl-hydrazine. 1-dimethylamino-piperidone-(4) has been described in the literature on the subject. The corresponding piperidones, in which R signifies other dialkylamino radicals, may be produced by the addition of 1 mol of a hydrazine of formula (lower alkyl)$_2$N—NH$_2$ to 2 mols of an acrylic acid ester, ring closure of the so obtained diester (e.g. with sodium hydride in xylene at a temperature of 140°), saponification and subsequent decarboxylation.

The production of hydrazones of Formula II, in which R signifies a lower alkyl or aralkyl radical, X signifies a hydrogen atom and Y signifies an acyl radical, is effected by condensing a piperidone-(4), suitably substituted in the 1-position, with a monoacyl-hydrazine.

Hydrazones of Formula II, in which R signifies a lower alkyl radical, X signifies a hydrogen atom and Y signifies the radical

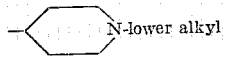

may be produced by condensation of a 1-(lower alkyl)-piperidone-(4) with a [1-(lower alkyl)-piperidyl-(4)]-hydrazine. When 2 mols of the same piperidone are condensed with 1 mol of hydrazine hydrate, the corresponding azine of Formula II, in which R signifies a lower alkyl radical, X and Y together signify the radical

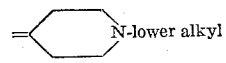

is obtained; these azines are new. When, instead of a 1-alkyl-piperidone-(4), 2 mols of a 1-dialkylamino-piperidone-(4) are reacted with 1 mol of hydrazine hydrate, new azines of Formula II, in which R signifies a dialkylamino radical and X and Y together signify the radical

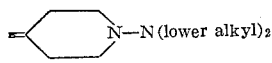

are obtained.

The hydrazine derivatives of the present invention are basic compounds; with inorganic or organic acids, e.g. hydrochloric, hydrobromic, sulphuric, benzoic, nicotinic, methanesulphonic, p-toluenesulphonic, maleic, fumaric, tartaric, malic and citric acid, they form crystalline salts which are stable at room temperature.

The compounds of Formula I may be used as intermediates for the production of pharmaceuticals, e.g. of the pyrazolone or guanidine series; additionally they have themselves therapeutically valuable pharmacodynamic properties, for example a monoamine oxidase inhibiting effect which is useful for the treatment of psychic depressive conditions. They also are suitable for use as oxidation inhibitors for benzine and lubricating oils and/or to increase the stability of liquid motor fuels for storage.

In the following non-limitative examples all temperatures are indicated in degrees centigrade. The melting and boiling points are uncorrected.

*Example 1.—1-acetyl-2-[1'-dimethylamino-piperidyl-(4')]-hydrazine*

3.96 g. of 1-acetyl-2-[1'-dimethylamino-piperidylidene-(4')]-hydrazine are added to the solution which has been cooled on an ice bath of 0.76 g. of sodium borohydride in 10 ml. of water. After two hours the ice bath is removed and the mixture stirred for 22 hours at room temperature. In order to decompose the excess sodium borohydride the reaction solution is heated at reflux for ½-hour together with 10 ml. of methanol. After the methanol has been distilled off at normal pressure, the mixture is exhaustively extracted with chloroform. The residue obtained after evaporation of the solvent is distilled at 0.01 mm. Hg, whereby the 1-acetyl-2-[1'-dimethylamino-piperidyl-(4')]-hydrazine distills over at between 160 and 165° in the form of a very viscous oil.

The starting material may be produced as follows:

15.5 g. of 1-dimethylamino-piperidone-(4) are heated at reflux together with 8.1 g. of acetyl hydrazine for 12 hours at a bath temperature of 80°. Upon subsequent distillation the 1-acetyl-2-[1'-dimethylamino-piperidylidene-(4')]-hydrazine distills over at a pressure of 0.07 mm. Hg and at a temperature of 164°. The compound crystallizes upon standing; melting point: 129°.

*Example 2.—1-dimethylamino-piperidyl-(4)-hydrazine*

1 - acetyl - 2 - [1' - dimethylamino - piperidyl - (4')]-hydrazine is first produced in accordance with the process described in Example 1.

2.0 g. of 1-acetyl-2-[1'-dimethylamino-piperidyl-(4')]-hydrazine are heated at reflux in 20 ml. of 24% hydrochloric acid for 5 hours. After evaporating the reaction solution to dryness in a vacuum, 5 ml. of 50% caustic potash solution and subsequently an excess of solid potassium hydroxide are added whilst cooling with ice and the mixture exhaustively extracted with ether. The ether solutions are combined, the ether is distilled off and the resulting residue is fractionated at 14 mm. Hg, whereby 1-dimethylamino-piperidyl-(4)-hydrazine distills over at a temperature between 135° and 140°.

A sample of the hydrazine is converted into the dimaleate; melting point 143–144° after recrystallizing from ethanol.

*Example 3.—1-acetyl-2-[1'-dipropylamino-piperidyl-(4')]-hydrazine*

26.0 g. of 1-acetyl-2-[1'-dipropylamino-piperidylidene-(4')]-hydrazine are added to a solution which has been cooled on an ice bath of 7.7 g. of sodium borohydride in 60 ml. of water. It is stirred for 4 hours on an ice bath, for 16 hours at room temperature and subsequently for a further 6 hours at 50°. In order to decompose the excess sodium borohydride 100 ml. of methanol are added, the mixture heated for 1 hour at reflux and the methanol distilled off at normal pressure. After cooling to room temperature, it is exhaustively extracted with chloroform; the combined organic phases are dried over magnesium sulphate and concentrated in the usual vacuum. By distillation of the residue in a high vacuum 1-acetyl-2-[1'-dipropylamino-piperidyl-(4')]-hydrazine is obtained, having a boiling point of 155–160°/0.15 mm. Hg.

The starting material may be produced as follows:

158.3 g. of asymmetric dipropyl-hydrazine are heated to 110° together with 345 g. of acrylic acid ester for 48 hours at reflux. By distillation of the residue in a high vacuum 1,1-dipropyl-2-[di-(β-ethoxy-carbonylethyl)]-hydrazine is obtained, having a boiling point of 141–145°/0.04 mm. Hg.

247 g. of 1,1-dipropyl-2-[di-(β-ethoxy-carbonylethyl)]-hydrazine are carefully added to a mixture which has been heated to the boil of 47 g. of a 50% sodium hydride dispersion in oil and 1400 of absolute xylene during the course of 1½ hour in a 4500 ml. sulphonation flask fitted with a cooler, stirrer, dropping funnel and thermometer. After a further 3½ hours it is cooled on an ice bath and the reaction mixture poured on 1 kg. of ice after diluting with 300 ml. of xylene. 600 ml. of concentrated hydrochloric acid are added to the aqueous layer while cooling with ice and subsequently it is heated for 4 hours at reflux. The dark brown reaction solution is made strongly alkaline with 50% caustic potash solution while cooling well and exhaustively extracted with chloroform. The combined organic extracts are washed with water, dried over magnesium sulphate and concentrated by evaporation. Upon subsequent distillation in a high vacuum in the presence of an inert gas, 1-(dipropyl-amino)-piperidone-(4) is obtained, which has a boiling point of 86–88°/0.02 mm. Hg. 10.7 g. of acetyl-hydrazine are heated to 100° together with 26.6 g. of 1-(dipropylamino)-piperidone-(4) for 5 hours. By distillation of the reaction product in a high vacuum 1-acetyl-2-[1'-dipropylamino - piperidylidene - (4')] - hydrazine is obtained which has a boiling point of 175–180°/0.5 mm. Hg.

*Example 4.—1-dipropylamino-piperidyl-(4)-hydrazine*

1 - acetyl-2-[1'-dipropylamino-piperidyl-(4')-hydrazine is first produced in accordance with the process described in Example 3.

19.0 g. of 1-acetyl-2-[1'-dipropylamino-piperidyl-(4')]-hydrazine are heated at reflux together with 100 ml. of 24% hydrochloric acid for 10 hours. The cooled reaction solution is evaporated to dryness, 35 ml. of 50% caustic potash solution and then an excess of solid potassium hydroxide are added to the resulting residue and it is then exhaustively extracted with tetrahydrofuran. The organic extracts are dried over solid potassium hydroxide and concentrated in the usual vacuum. By distillation of the residue the 1-dipropylamino-piperidyl-(4)-hydrazine is obtained which has a boiling point of 160–170°/14 mm. Hg.

For converting into the dimaleate the calculated quantity of maleic acid is added to an ethanolic solution of the hydrazine; melting point 148–150° after recrystallizing from ethanol.

*Example 5.—1-acetyl-2-[1'-dibutylamino-piperidyl-(4')]-hydrazine*

3.1 g. of sodium borohydride are added to a solution of 9.0 g. of 1-acetyl-2-[1'-dibutylamino-piperidylidene-(4)]-hydrazine in 60 ml. of 50% aqueous methanol at a temperature of 2–7°. It is stirred for 15 hours at room temperature and after the addition of 30 ml. of methanol it is stirred for a further hour at reflux temperature. The methanol is distilled off at normal pressure and the residue exhaustively extracted with chloroform. The combined chloroform extracts are dried over magnesium sulphate and concentrated in the usual vacuum. Upon subsequent distillation in a high vacuum 1-acetyl-2-[1'-dibutylamino-piperidyl-(4')]-hydrazine distils over at a pressure of 0.04 mm. Hg at between 170° and 180°.

The starting material may be produced as follows:
182 g. of asymmetric di-n-butylhydrazine are heated to 130° together with 320 g. of acrylic acid ethyl ester for 48 hours. Upon subsequent distillation at a pressure of 0.02 mm. Hg the 1,1-di-n-butyl-2,2-di-(β-ethoxycarbonylethyl)-hydrazine distils over at 160°. 30 g. of 1,1-di-n-butyl-2,2-di-(β-ethoxycarbonylethyl) - hydrazine are added to a mixture of 52.5 g. of a 50% sodium hydride suspension in paraffin oil and 1500 ml. of absolute xylene, the oil bath is heated to 170° and after the reaction commences a further 270 g. of the hydrazine are carefully added dropwise during the course of 6 hours. After diluting with 300 ml. of xylene and cooling on an ice bath the reaction mixture is poured on 1 kg. of ice. The dark brown, aqueous phase is separated and 600 ml. of concentrated hydrochloric acid are added while cooling well and stirring. The resulting solution is heated at reflux until the ferric chloride reaction disappears, a 50% caustic potash solution added whilst cooling with ice until a strong alkaline reaction is obtained and it is extracted exhaustively with chloroform. The combined chloroform extracts are washed with water, dried over magnesium sulphate and concentrated in the usual vacuum. Upon subsequent distillation of the residue the pure 1-di-n-butylamino-piperidone-(4) distils over at a pressure of 0.09 mm. Hg at between 95° and 98°.

7.6 g. of 1-di-n-butylamino-piperidone-(4) and 2.7 g. of N-acetyl-hydrazine are heated to 100° for 4 hours. Upon subsequent distillation in a high vacuum the 1-acetyl - 2-[1'-dibutylamino-piperidylidene-(4')]-hydrazine distils over at a pressure of 0.2 mm. Hg at between 160° and 170°.

*Example 6.—[1-dibutylamino-piperidyl-(4)]-hydrazine*

The solution of 6.7 g. of 1-acetyl-2-[1'-dibutylamino-piperidyl-(4')]-hydrazine in 40 ml. of 24% hydrochloric acid is heated at reflux for 8 hours. It is evaporated to dryness in the usual vacuum, 20 ml. of 50% caustic potash solution are added to the residue while cooling with ice, an excess of solid potassium hydroxide is added and the mixture exhaustively extracted with tetrahydrofuran. The combined organic extracts are dried over solid potassium hydroxide and concentrated in the usual vacuum. Upon subsequent distillation in a high vacuum at a pressure of 0.09 mm. Hg the [1-dibutylamino-piperidyl-(4)]-hydrazine distils over at 100° to 110° in the form of a colourless liquid.

The solution of 1.6 g. of maleic acid in 6 ml. of ethanol is added to a sample of 1.7 g. of the hydrazine. After concentrating the solution and leaving it to stand the dimaleate crystallizes in the form of colourless crystals having a melting point of 160–161°.

*Example 7.—1,2-bis-[1'-methyl-piperidyl-(4')]-hydrazine*

All operations are effected under careful exclusion of atmospheric oxygen. 22.4 g. of 1-[1'-methyl-piperidyl-(4')] - 2 - [1''-methyl-piperidylidene-(4'')]-hydrazine are added to a solution of 7.6 g. (0.2 mols) of sodium borohydride in 50 ml. of distilled water while cooling with ice. After removing the ice bath it is stirred for 16 hours at room temperature. In order to decompose the excess reduction agent it is heated with 100 ml. of methanol for 1 hour at reflux and subsequently the methanol is distilled off at normal pressure. The residue is exhaustively extracted with chloroform, the combined chloroform extracts are dried over magnesium sulphate and evaporated in a vacuum. The maleate is produced by adding a solution of 34.8 g. of maleic acid in 100 ml. of ethanol to the resulting residue and the precipitated trimaleate is recrystallized from water/ethanol for further purification. Melting point 151–152°.

The starting material may be produced as follows:
21.8 g. of 1-methyl-piperidone-(4)- and 25.8 g. of 1-methyl-piperidyl-4-hydrazine are heated to 80° for 6 hours. Upon subsequent distillation 1-[1'-methyl-piperidylidene-(4')]-2-[1''-methyl-piperidyl-(4'')]-hydrazine distils over at a pressure of 0.08 mm. Hg at between 120° and 121°. The hydrazone crystallizes upon standing; melting point 39–41°.

*Example 8.—1,2-bis-[1'-methyl-piperidyl-(4')]-hydrazine*

All operations are effected under careful exclusion of atmospheric oxygen. 8.9 g. of 1,2-bis-[1'-methyl-piperidylidene-(4')]-hydrazine are added to the solution cooled on an ice bath of 6.05 g. of sodium borohydride in 40 ml. of water and after removing the ice bath it is stirred for 24 hours at room temperature. The reaction solution is subsequently heated with 100 ml. of methanol for one hour at reflux and the methanol distilled off at normal pressure. It is then exhaustively extracted with chloroform, the combined organic phases are dried over magnesium sulphate and concentrated in the usual vacuum. For conversion into the maleate a solution of 13.9 g. of maleic acid in 40 ml. of ethanol is added to the resulting residue and the precipitated trimaleate is filtered off. For purposes of analysis it is recrystallized from water/ethanol, melting point 151–152°, and it is identical with the compound obtained in Example 7.

The starting material may be produced as follows:

56.5 g. of 1-methylpiperidone-(4) and 12.5 g. of hydrazine hydrate are combined while cooling and subsequently heated to 80° for 3 hours. Upon subsequent distillation 1,2-bis[1'-methyl-piperidylidene-(4')]-hydrazine distils over at a pressure of 0.07 mm. Hg at between 115° and 119°. The compound crystallizes upon standing (melting point 58–62°) and may be recrystallized from petroleum ether. From 0.02 mol of the above azine and 0.04 mol of maleic acid, 7.4 g. of dimaleate, having a melting point of 149–151°, may be obtained after recrystallizing from 75 ml. of ethanol.

*Example 9.—1,2-bis[1'-dimethylamino-piperidyl-(4')]-hydrazine*

All operations are effected under careful exclusion of atmospheric oxygen. 11.2 g. of 1,2-bis-[1'-dimethylamino-piperidylidene-(4')]-hydrazine are added to a solution of 6.05 g. of sodium borohydride in 40 ml. of distilled water while cooling with ice. After removing the ice bath it is stirred overnight at room temperature, the reaction mixture is subsequently heated at reflux with 100 ml. of methanol for ½-hour and the methanol is distilled off at normal pressure. The residue is exhaustively extracted with chloroform, the combined organic extracts are dried over magnesium sulphate and concentrated in a vacuum. For conversion into the trimaleate a solution of 13.9 g. of maleic acid in 30 ml. of ethanol is added to the resulting residue. The precipitated crystallisate is separated and recrystallized from methanol for purposes of analysis; melting point 165° (decomposition). It is a trimaleate.

The starting material may be produced as follows:

31.0 g. of 1-dimethylamino-piperidone-(4) and 12.0 g. of hydrazine hydrate are heated to 80° for 12 hours. Upon subsequent distillation the 1,2-bis[1'-dimethylamino-piperidylidene-(4')]-hydrazine distils over under a pressure of 0.03 mm. Hg at between 178° and 181°. The compound solidifies upon standing; melting point 88–90°. From 10 millimols of the above azine and 20 millimols of maleic acid 4.1 g. of analytically pure dimaleate are obtained (melting point 159°–160°) after recrystallizing from 160 ml. of ethanol.

*Example 10.—1-acetyl-2-[1'-methyl-piperidyl-(4')]-hydrazine*

All operations are effected under careful exclusion of atmospheric oxygen. 33.8 g. of 1-acetyl-2-[1'-methyl-piperidylidene-(4')]-hydrazine are added portionwise during the course of ½ hour to a solution which has been cooled in an ice bath of 15.2 g. of sodium borohydride in 100 ml. of distilled water. It is maintained for some time on the ice bath and is stirred over night at room temperature. In order to decompose the excess reduction agent the yellowish solution is heated at reflux with 200 ml. of methanol for one hour and the methanol is subsequently distilled off at normal pressure. The residue is exhaustively extracted with chloroform and the extract is concentrated in a partial vacuum after drying over magnesium sulphate. Upon subsequent distillation of the residue 1-acetyl-2-[1'-methyl-piperidyl-(4')-hydrazine distils over at a pressure of 0.2 mm. Hg at between 165° and 175°; the compound crystallizes upon standing, melting point 106°.

The starting material may be produced as follows:

24.4 g. of acetylhydrazine are heated to 80° with 34.1 g. of 1-methylpiperidone-(4) for 3½ hours. The reaction product consisting of two layers yields 1-acetyl-2-[1'-methyl-piperidylidene-(4')]-hydrazine, having a boiling point of 165–170°/0.15 mm. Hg, upon subsequent distillation. The compound crystallizes upon standing; melting point 106°.

*Example 11.—1-acetyl-2-[1'-benzyl-piperidyl-(4')]-hydrazine*

All operations are effected under careful exclusion of atmospheric oxygen. 100 g. of 1-acetyl-2-[1'-benzyl-piperidylidene-(4')]-hydrazine are added portionwise to a solution of 29.6 g. of sodium borohydride in 200 ml. of water during the course of one hour while cooling with ice, after a further 2 hours the ice bath is removed and the mixture stirred for 15 hours at room temperature. The reaction mixture is then heated for one hour at reflux after the addition of 200 ml. of methanol and the methanol is subsequently distilled off at normal pressure. The residue is exhaustively extracted with chloroform, the combined organic phases are dried over magnesium sulphate and concentrated in a vacuum. 1-acetyl-2-[1'-benzyl-piperidyl-(4')]-hydrazine is obtained as a crystalline residue. 5.0 g. of the crude product are recrystallized from ethyl acetate for purposes of analysis; melting point 115–116°.

The starting material may be produced as follows:

48.4 g. of acetylhydrazine and 113.6 g. of 1-benzyl-piperidone-(4) are heated to 100° for 6 hours, whereby the reaction mixture is mixed well with a spatula from time to time. After cooling it is triturated with 50 ml. of ethyl acetate, the crystallisate is filtered off and dried in the usual vacuum. A sample of 5 g. of the residue is recrystallized from 8 ml. of ethyl acetate; analytically pure 1-acetyl-2-[1'-benzyl-piperidylidene-(4')]-hydrazine, having a melting point of 134–136°, is obtained.

Having thus disclosed the invention, what we claim is:

1. A compound selected from the group consisting of a hydrazine derivative of the formula

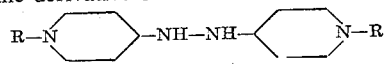

wherein R is a member selected from the group consisting of lower alkyl, and lower dialkyl-amino, and inorganic and organic acid addition salts thereof.

2. A compound selected from the group consisting of a hydrazine derivative of the formula

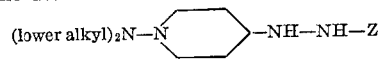

wherein Z is a member selected from the group consisting of hydrogen and lower alkanoyl and inorganic and organic acid addition salts thereof.

3. 1-acetyl-2-[1'-dimethylamino-piperidyl-(4')]-hydrazine.
4. 1-dimethylamino-piperidyl-(4)-hydrazine.
5. 1 - acetyl - 2-[1'-dipropylamino-piperidyl-(4')]-hydrazine.
6. 1-dipropylamino-piperidyl-(4)-hydrazine.
7. 1 - acetyl-2-[1'-dibutylamino-piperidyl-(4')]-hydrazine.
8. [1-dibutylamino-piperidyl-(4)]-hydrazine.
9. 1,2-bis-[1'-methyl-piperidyl-(4')]-hydrazine.
10. 1,2-bis[1'-dimethylamino-pieridyl-(4')]-hydrazine.
11. 1-acetyl-2-[1'-benzyl-piperidyl-(4')]-hydrazine.

References Cited

UNITED STATES PATENTS

| | | | |
|---|---|---|---|
| 2,830,050 | 4/1958 | Biel | 260—293 |
| 2,883,389 | 4/1959 | Jucker et al. | 260—293 |
| 3,060,192 | 10/1962 | Bernstein et al. | 260—294 |

WALTER A. MODANCE, *Primary Examiner.*

AVROM D. SPEVACK, *Assistant Examiner.*